(12) United States Patent
Schroader et al.

(10) Patent No.: US 9,694,987 B1
(45) Date of Patent: Jul. 4, 2017

(54) CONVEYOR GLIDE PLATE

(71) Applicants: Steven Vann Schroader, Louisville, KY (US); Tyler Herman, Louisville, KY (US); Piyush Nandanwar, Louisville, KY (US)

(72) Inventors: Steven Vann Schroader, Louisville, KY (US); Tyler Herman, Louisville, KY (US); Piyush Nandanwar, Louisville, KY (US)

(73) Assignee: FIVES INTRALOGISTICS CORP., Louisville, KY (US)

( * ) Notice: Subject to any disclaimer, the term of this patent is extended or adjusted under 35 U.S.C. 154(b) by 0 days.

(21) Appl. No.: 14/757,664

(22) Filed: Dec. 22, 2015

(51) Int. Cl.
*B65G 47/66* (2006.01)
*B65G 11/02* (2006.01)

(52) U.S. Cl.
CPC ............ *B65G 47/66* (2013.01); *B65G 11/023* (2013.01)

(58) Field of Classification Search
CPC ............................. B65G 47/66; B65G 11/023
USPC ........................................................ 198/600
See application file for complete search history.

(56) References Cited

U.S. PATENT DOCUMENTS

| | | | | |
|---|---|---|---|---|
| 4,718,543 A | * | 1/1988 | Leisner | B65G 17/24 198/779 |
| 4,901,845 A | * | 2/1990 | Zorgiebel | B65G 13/071 198/780 |
| 5,311,982 A | * | 5/1994 | Clopton | B65G 17/002 198/779 |
| 6,848,583 B2 | | 2/2005 | Largent | |
| 6,896,122 B2 | | 5/2005 | Gambrell et al. | |
| 7,137,505 B2 | | 11/2006 | Stebnicki et al. | |
| 7,287,640 B1 | | 10/2007 | Schmutzler | |
| 7,721,874 B2 | | 5/2010 | Chen | |
| 2010/0230247 A1 | * | 9/2010 | Mckee | B65G 47/66 198/804 |
| 2014/0183002 A1 | | 7/2014 | Tully | |
| 2014/0183006 A1 | | 7/2014 | Tully | |
| 2015/0291368 A1 | * | 10/2015 | Pettinga | B65G 47/66 198/600 |

* cited by examiner

*Primary Examiner* — Mark A Deuble
(74) *Attorney, Agent, or Firm* — Carrithers Law Office PLLC

(57) ABSTRACT

Conveyor glide plates inserted between conveyor rollers provide support between the rollers. The glide plate main body includes forward and rear flexible flaps forming a leading edge and a trailing edge extending from the main body which includes an attachment member for cooperatively engaging a conveyor roller support member such as a clip or bracket used to affix the rollers to the conveyor. The front portion of the forward distal end of the glide plate includes a concave curve extending from the leading edge downward forming a turned-up lip extending from the main body of the glide plate following the adjacent roller. A rear flap having a distal end angled downward slightly at the trailing edge extends toward a following roller or following glide plate. The width of the glide plate is selected based on the width of the conveyor or length of the roller.

27 Claims, 5 Drawing Sheets

CONVEYOR GLIDE PLATE

TECHNICAL FIELD OF THE INVENTION

This invention relates generally to a conveyor roller replacement system for replacing selected conveyor rollers with a modular conveyor glide plate support assembly.

BACKGROUND OF THE INVENTION

The present invention relates to material handling and in particular to methods and apparatuses for conveying packages.

Roller conveyors include a plurality of closed spaced conveyors. They are designed for conveying packages at least six inches long so the conveyor rollers must be typically be spaced within inches of each other to prevent the package from falling in between. Moreover, conveyor rollers are often used to move and direct articles in a forward and/or lateral direction. The conveyor rollers are supported by a spindle and are rotatable on a axis which can be slanted to bias articles in a forward and lateral direction as opposed to chain conveyors which only pull in a single forward or backward direction.

SUMMARY OF THE INVENTION

Depending upon the conveyor load, a cost savings can be realized by substituting inexpensive glide plate support members or specially designed spacers between the conveyors to take the place of one or more rollers depending upon the size of the articles conveyor on the conveyor rollers. The glide plate support members of the instant invention are inexpensive and can be used between rollers or positioned in a series between rollers in order to facilitate movement of parcels, packages, bags, or other articles by a conveyor utilizing rollers to move articles in a forward and/or a lateral direction depending upon the orientation of the conveyor rollers and minimize articles or parts thereof falling in-between the conveyor rollers causing damage to the article conveyed or the conveyor. The glide plates of the present invention are fabricated in a corresponding size in order to be removably inserted as needed for conveyor rollers in a conveyor assembly. The glide plates are light and inexpensive to fabricate as compared to conveyor rollers and have no moving parts. The length corresponds to the length of the conveyor rollers replaced by the glide plates. The width of the glide plates is variable and depends upon the length of the conveyor roller or width of the conveyor. It is contemplated that selected surfaces or portions of the glide plates can include areas coated or covered in materials having different friction capabilities, anti static properties, low friction and high wear capabilities such as TEFLON, high friction properties such as a rubber or polymer coating, variable porosity. It is also contemplated that the length and width of one or more glide plates may be varied to provide directional bias and enhancement to a curved section of the conveyor.

Conveyor glide plates are inserted or disposed between conveyor rollers providing spacer support members between the rollers for conveyance of articles thereover. The conveyor glide plate assembly includes a glide plate main body with a forward flap and rearward flap forming the leading edge and trailing edge extending from the main body. Preferably the flaps are formed of a flexible material such as a polymer. It is contemplated that the flaps may be attached to the top of the main body by means such as glue, screws, fasteners, tongue and groove arrangement or other fastening means or that the main body and flaps are fabricated, molded or formed as an integral body. The glide plate main body includes prongs or flanges extending from a bottom surface of the main body for cooperatively engaging holding means extending from the inner side walls of a lateral cross member. A clip insertable into the distal end of the lateral cross member includes a holding means such as an aperture for receiving a bolt or other removable holding means attachable to the conveyor roller bracket.

The conveyor roller bracket is used to removably hold conventional conveyor rollers in position on the conveyor frame. The front portion or front flap of the glide plate includes a concave curve extending from a leading edge turning downward forming a turned-up lip extending from the main body of the glideplate following the adjacent roller. A rear flap having a distal end angled or curved downward slightly at the trailing edge extends toward a following roller or following glide plate. The width of the glide plate is selected based on the length of the conveyor or length of the conveyor roller.

The glide plate assembly of the present invention provides a spacer means for removing selected conveyor rollers and substituting a glide plate support therefor. The glide plate assembly includes lateral cross members extending between the end of the longitudinal conveyor frame members. The lateral cross members include attachment and/or holding means defining support clips which correspondingly engage and are removably attached and detached to conveyor frame roller support brackets. The main body of the glide plate includes a pair of opposing off-center glide plate attachment flanges or prongs extending from the bottom surface thereof having an exterior size and shape corresponding to the cross-sectional shape of the lateral cross member whereby the glide plate opposing attachment flanges include a distal edge projection or outwardly curved lip which cooperatively engage inwardly turned flanges holding the glide plate in position across the lateral cross member. Typically the length of the glide plate and the lateral cross member will be of corresponding length; however, it is anticipated that a plurality of glide plates of a selected length can be used on the same lateral cross member such as to repair a damaged section. The distal end of the lateral cross member holds the support clip disposed therein which is removably attached to the attachment bracket of the conveyor.

It is an object of the present invention to provide a glide plate including holding means such as downwardly opposing flanges defining prongs extending from a bottom surface for cooperatively engaging an upper inner edge or outer curved edge of a lateral cross member.

It is an object of the present invention to provide a glide plate including a main body with a front flap or tab extending therefrom and a rear flap or tab extending therefrom.

It is an object of the present invention to provide a glide plate support clip including spaced apart off-center upwardly extending projections or flanges adjacent to the opposing inner side walls of a lateral cross member and cooperatively engaging the inner curved edge of the lateral cross member.

It is an object of the present invention to provide a glide plate connecting to a lateral cross member and held into position to a conveyor bracket by a glide plate clip which is insertable within the lateral cross member.

It is an object of the present invention to provide a glide plate wherein the front portion of the spacer may be molded or formed so that the forward distal end of the flap includes a concave curve downward and a forms a flexible lip which is turned upward and having a leading edge spaced apart from the surface of an adjacent roller in order to eliminate scraping noises and facilitate smooth transition of an article moving from the conveyor roller to the conveyor glide plate.

It is an object of the present invention to provide a glide plate wherein the rear portion of the support clip strip defines a rear flap having a trailing edge which extends toward the following conveyor.

It is an object of the present invention to provide a glide plate assembly which can be substituted for conventional conveyor rollers and attached to conventional conveyor frame roller attachment brackets.

The present invention also provides a glide plate assembly which can be inserted between adjacent rollers of the conveyor in order to prevent debris from getting in between the rollers and jamming the rollers.

It is an object of the present invention to provide a removable glide plate which can be substituted for a conveyor roller.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
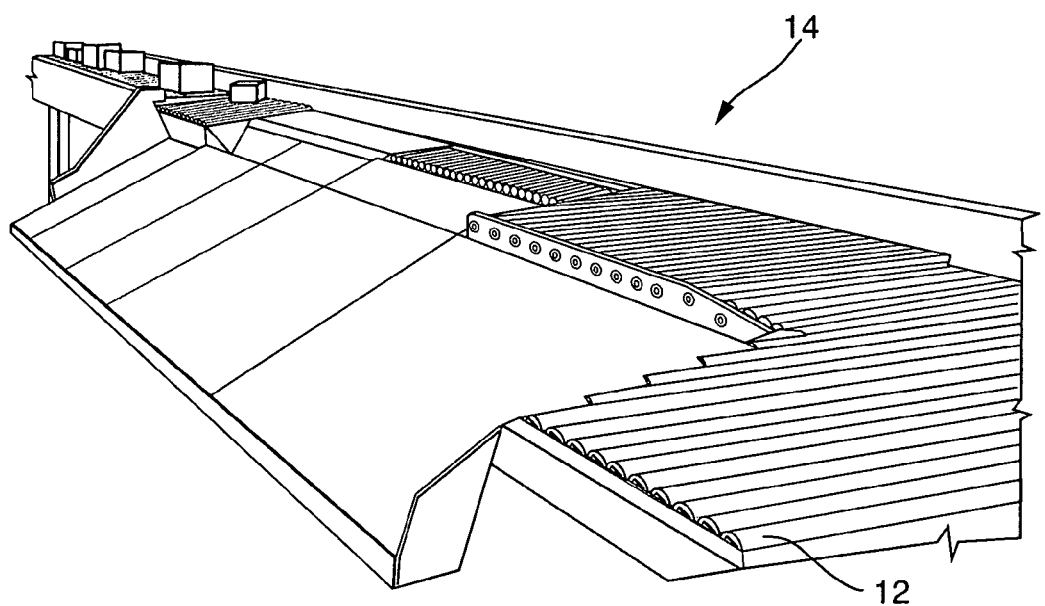
FIG. 1 is an isometric view of a conventional roller conveyor including a plurality of rollers.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications fo the principles of the invention as illustrated therein being contemplated as would normally occur to one skilled in the art to which the invention relates.

As shown in FIG. 1 and labeled as prior art, conventional conveyor roller assembly 14 include a plurality of conveyor rollers 12 positioned within a frame whereby each roller can freely rotate about its axis in the absence of an applied braking force. The conveyor can be belt driven and/or include gravity driven conveyor rollers and the rollers can be positioned to provide both forward and lateral motion to articles conveyed thereover.

The present invention provides an inexpensive modular conveyor roller replacement assembly including a modular conveyor glide plate assembly 10 providing a removable and insertable spacer which can be substituted for conveyor rollers 12 in a roller conveyor assembly 14, (preferably replacing alternate rollers), to maintain a substantially solid surface when supporting a lighter load. The modular conveyor roller glide plate assembly 10 mounts to an existing conveyor roller frame for easy attachment and removal and bridges the gap between alternating conveyor rollers 12 replacing selected alternating rollers 12 and providing a substantially solid surface for conveyance of articles there over.

Conventional conveyor rollers 12 are supported by left and right longitudinal frame members 16. A plurality of conveyor angle brackets 18 are attached to the inner wall 20 of each longitudinal frame member 16 in spaced apart alignment with opposing angle brackets 18 affixed to the opposing frame member 16. The angle brackets 18 may be mounted flat adjacent the surface of the wall 20 of the frame member 16, of juxtaposed whereby a portion of the angle bracket 18 extends at a selected angle defining a tab 22 having a aperture 24 therein for holding a bolt 26 or hinge pin to cooperatively engage a holding means such as a nut 28 securing a support clip 90 on the distal end of a conveyor roller 12 thereto.

The glide plate assembly 10 comprises or consists of a longitudinal lateral cross member 30 which extends a selected length between the left and right longitudinal frame members 16. The lateral cross member is formed typically by extrusion and comprises a generally "U-shaped" cross sectional area having a bottom base 36 with opposing side walls 33, 35 extending upward and having an open top. The upper edges 59 of the upper portion of the side walls 33, 35 curve inward forming a flange or lip 60 extending inwardly and downward along the edge of the lateral cross member 30. More particularly, the curved inwardly extending lips 60 can terminate at selected intervals along the length of the lateral cross member 30 and still provide a holding means for securing a glide plate 34 covering the lateral cross member 30 and cooperatively engaging a support clip 90 removably attaching to each end for attaching the lateral cross member 30 to the conveyor frame brackets 18.

As shown in FIGS. 1-7, the lateral cross member 30 comprises a U-shaped cross-section defining side walls 33, 35 extending upward from an integrally formed flat bottom base 36 with upper curved side wall edges 59 defining spaced apart parallel side flanges or lips 60. It is contemplated that the cross-sectional shape of the lateral cross member can comprise a rectangular, semicircular, hexagonal, solid bar, or other shape so long as the upper portion includes means for cooperatively engaging the glide plate 34 such as the lip 60 extending from opposing sides of a lateral cross member 30.

Figure 2:
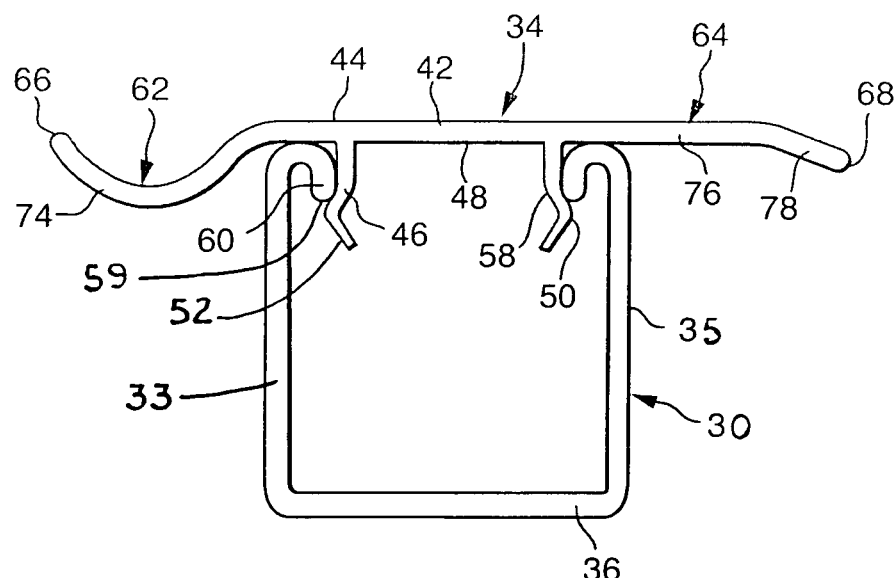
FIG. 2 is an end view showing a glide plate with the forward portion of the tab or flap including a concave curve forming a up-turned lip and the terminal leading edge rising to a position equal distance and in alignment with the top surface of the main body, and a rear flap extending form the main body having a terminal end portion angled slightly downward below the top surface of the main body, wherein spaced apart opposing flanges or prongs extending from a lower surface of the glide plate main body and includes shoulders for cooperative engagement with inwardly projecting distal edges defining flanges extending from the inner surface of the lateral cross member side walls.
Figure 3:
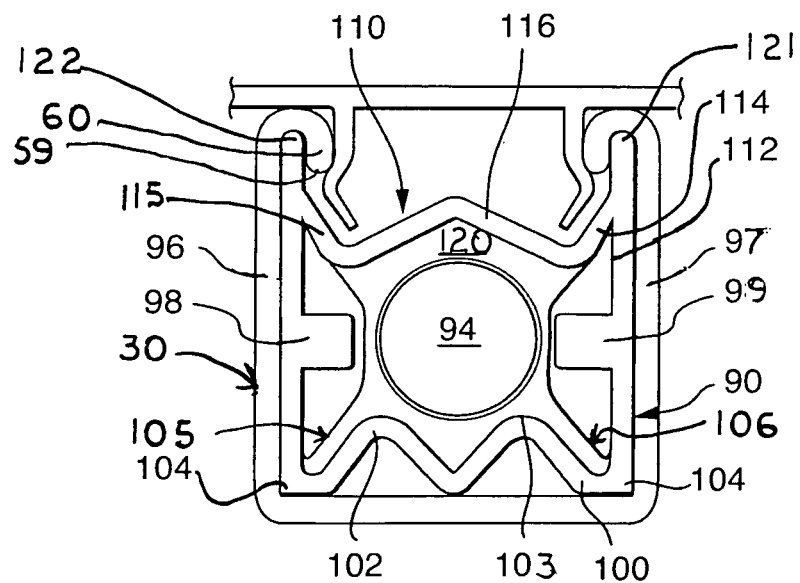
FIG. 3 is an end view of the glide plate assembly shown in FIG. 2 showing an attachment support clip inserted within the distal end of the lateral cross member having a central aperture for removably connecting same by a bolt to the conveyor frame roller bracket with the glide plate main body supported by the prongs cooperatively engaging the inwardly curved flanges of the side walls of the lateral cross member.
Figure 4:
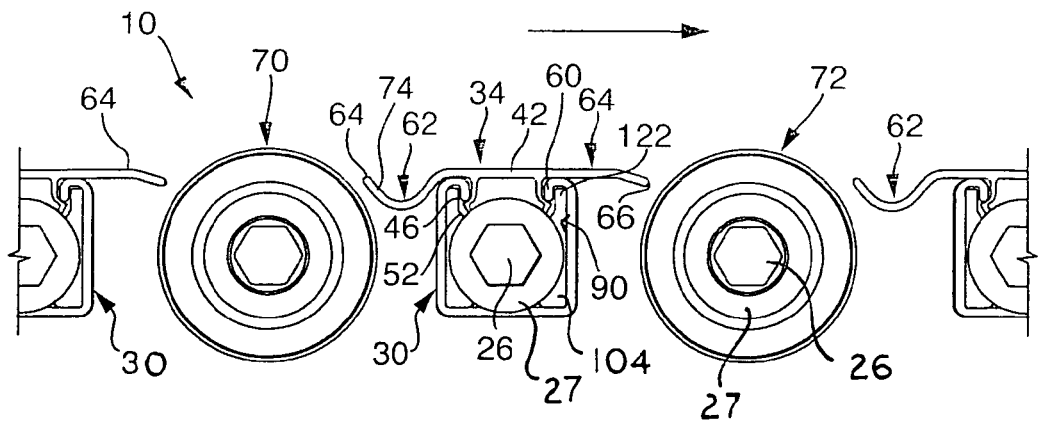
FIG. 4 is an end view of a portion of the conveyor showing the conveyor roller and glide plate assembly with the a bolt and washer holding the support clip within the lateral cross member to the attachment bracket supporting the lateral cross member supporting the glide plate between a pair of conveyor rollers, and showing the trailing edge of rear distal portion of the glide plate flap spaced apart from and angled downward slightly below the top surface of a following roller, and showing the leading edge of the front distal end portion of a following adjacent glide plate positioned slightly below the top surface of the prior roller with the front portion of the guide plate forming a downward curved portion extending to the main body of the glide plate.
Figure 5:
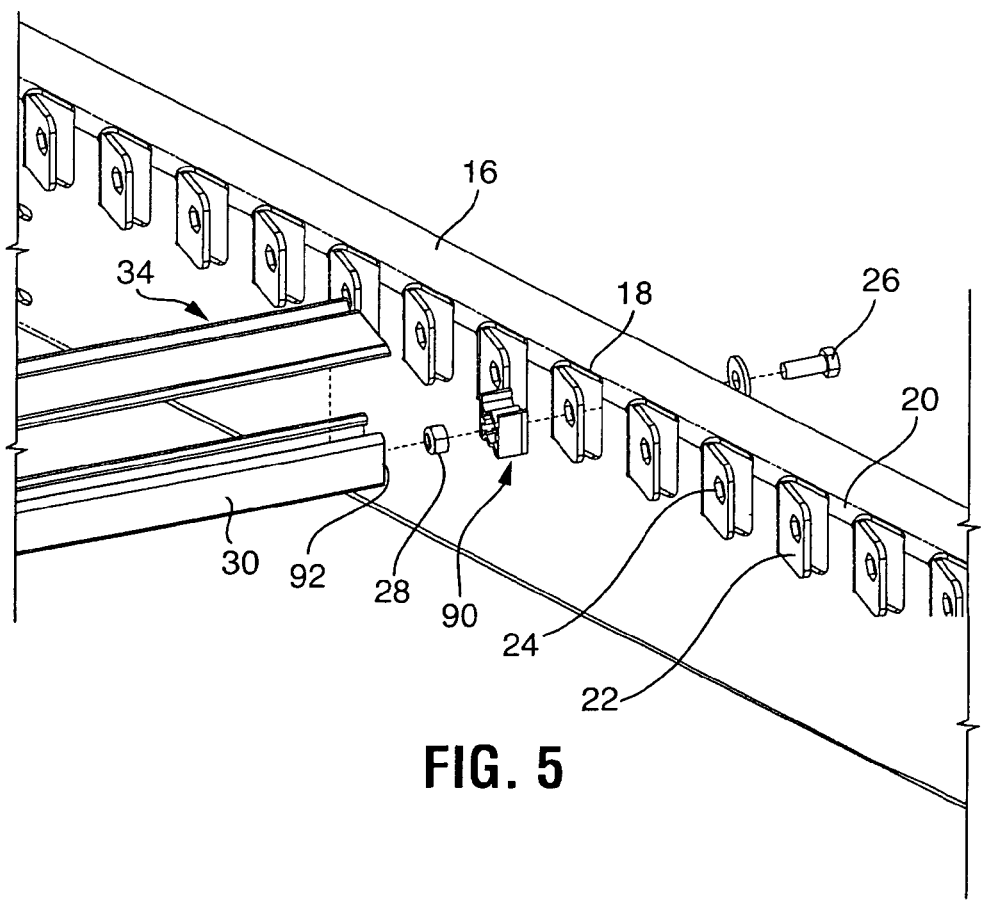
FIG. 5 is an isometric exploded view showing a single glide plate assembly installation with the attachment of the glide plate clip support to a conveyor roller bracket and insertion of the guide plate clip support within the distal end of the supporting lateral cross member supporting the glide plate.

As shown best in FIGS. 2-4 the glide plate 34 comprises or consists of at least one molded, extruded, or printed unitary strip of material formed from a polymer which is flexible and resilient. The glide plate 34 may be a hard plastic, soft plastic, rubber or fabric coated material, a copolymer having a surface of a particular texture, hardness, friction coefficient, or material such as aluminum or stainless steel, chrome steel or combinations thereof. The exterior surface of the glide plate may be a selected to provide a friction altering material to enhance or reduce friction such as polyurethane coating, paint coating, or metallic coating, ceramic material, silicone, TEFLON, or tape. Moreover, the insert surface or tread design may be solid or include pores, cross-hatching, irregularities, dimples, webbing or apertures there through or molded into a top surface thereof. The glide plate surface may include portions which are reinforced, thicker, or composed of a selected material to provide a desired amount of flexibility of spring to the front flap and/or rear flap of the inserted support member or support member strip.

The glide plate 34 includes a substantially rigid medial main body portion 42 which includes an upper surface 44 spanning between the outer surfaces of adjacent conveyor rollers with a length along the longitudinal axis greater than the gap between the adjacent conveyor rollers to substantially close the gap between the alternating conveyor rollers.

The spaced apart opposing legs or prongs 46 extending perpendicular from a lower surface 48 of the glide plate 34 main body 42 include outwardly an extending shoulder 50 for cooperative engagement with the inwardly projecting distal edges defining lips 60 of the lateral cross member side walls. 33, 35. The shoulder is formed on the outer surface of the prong 46 at a selected position spaced a selected distance from the lower surface. The shoulders 50 may comprise an outwardly angled portion 52 or a thicker region of the prong 46. The prongs 46 cooperatively engage the inwardly turned edge or lip 60 along the top inner edge of the lateral cross member member 30. The prongs 46 can be comprised of a flexible resilient material with sufficient elasticity and memory to snap or lock into a friction fit position cooperatively engaging the lip 60 or the glide plate 34 may be flexible enough to permit sufficient flexing at the center portion to enable the prongs 46 to be flexed and locked into position cooperatively engaging the lips 60 of the lateral cross member 30.

The glide plate 34 comprises a substantially rigid body with an upper surface 42 spanning between the outer surfaces of adjacent load conveyor rollers and has a length along the longitudinal axis of the conveyor that is slightly less than the gap between the adjacent conveyor rollers to substantially close the gap between the adjacent conveyor rollers. The glide plate 34 includes a front tab or flap 62 and rear projecting tab or flap 64 which extend to the adjacent conveyor rollers generally aligning the upper surface of the glide plate with the upper surface of the adjacent load rollers or slightly below the upper surface of the adjacent rollers. The terminal front end 66 of the front tab and terminal rear end 68 of the rear tab are formed to be positioned at a selected level with respect to the adjacent conveyor in accordance with the type of material to be conveyed whether it be aggregate material in bags, boxes and parcels, or consumer goods or merchandise.

FIGS. 2-4 show the front tab 62 of the glide plate member 34 is formed having a curved portion 74 extending below the upper surface of the glide plate member 34 main body 42 and having a front tab terminal front end 66 extending upward to a selected position whereby the terminal front end 66 is spaced slightly apart from the outer surface of the adjacent conveyor roller 70 providing a spring and flexing capability for the transfer of packages or parcels there over. The rear tab 64 has a horizontal or straight proximate portion 76 extending from the medial body portion 42 of the glide plate member 34 and a rear distal portion 78 which is angled downward slightly so that the terminal rear end 68 is positioned below the upper surface 44 of the glide plate main body 42 in order to flex as packages are transported there over to the adjacent conveyor roller 72. The terminal rear end 68 of tab 64 is spaced apart from the outer edge of the adjacent conveyor roller 72. As shown in the figures, the glide plate member 34 is disposed at a selected level slightly below the top surface of the adjacent front and rear conveyor rollers 70 and 72 respectively. As best illustrated in FIG. 4, the upper surface 44 glide plate 34 including the main body 42, front tab 62, and rear tab 64 are positioned below the top surface of the adjacent conveyor rollers 70, 72.

The front tab 62 and rear tab 64 extending from the main body 42 which are straight or angle upward or downward depending upon the required flexibility of the glide plate main body member 34; however, the front tab 62 could be angled instead of curved to provide the requisite flexibility and support and be of a longer or shorter length depending upon the requirement determined by the types of articles conveyed there over.

The glide plate member 34 and lateral cross member 30 shown in FIG. 3 include the support clip 90 removably disposed within the distal end 92 of the lateral cross member 30. The bracket 90 has a central aperture 94 for removably connecting same by a bolt 26 and washer 27 to the angle bracket 18 of the conveyor frame 16. The support clip 90 is molded from a polymer, or cast or stamped from metal. The support clip 90 includes a pair of spaced apart straight side walls 96 and 97 extending to a base plate 100 having a pair of support ridges 102 and 103 which extend to the bottom corner 104 of the side walls 96 and 97 defining legs. A pair of medial reinforcement tabs 98 and 99 protrude inwardly from the side walls 96 and 97. The top 110 of the support clip 90 extends from an inner surface 112 of the opposing side walls 96 and 97 downward toward the center aperture 94 and upward over the center aperture to a selected point 116 forming opposing reinforcement arms 114 and 115. The portion of the support clip 90 between the central aperture 90, the arms 114, 115, and the legs 105, 106 comprises a solid web of material defining a wall 120 including the aperture 94 for holding a bolt 26 which removably secures the wall 120 and support clip to the bracket 18 of the conveyor frame member 16. The portion of the side walls 96 and 97 extending above the reinforcement arms 114 and 115 define a pair of opposing flanges 121 and 122 which cooperatively engage the inwardly and downwardly curved edges forming the lips 60 of the lateral cross member 30 for slidable engagement therewith.

Figure 6:
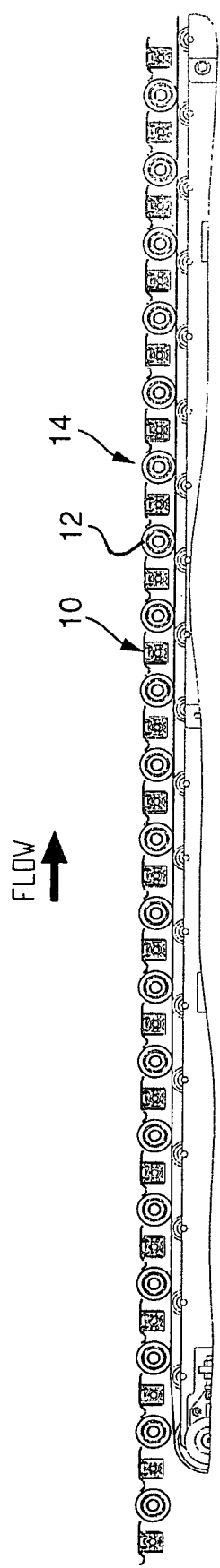
FIG. 6 is an end view showing a conveyor utilizing multiple glide plate assembly modules disposed between conventional conveyor rollers.
Figure 7:
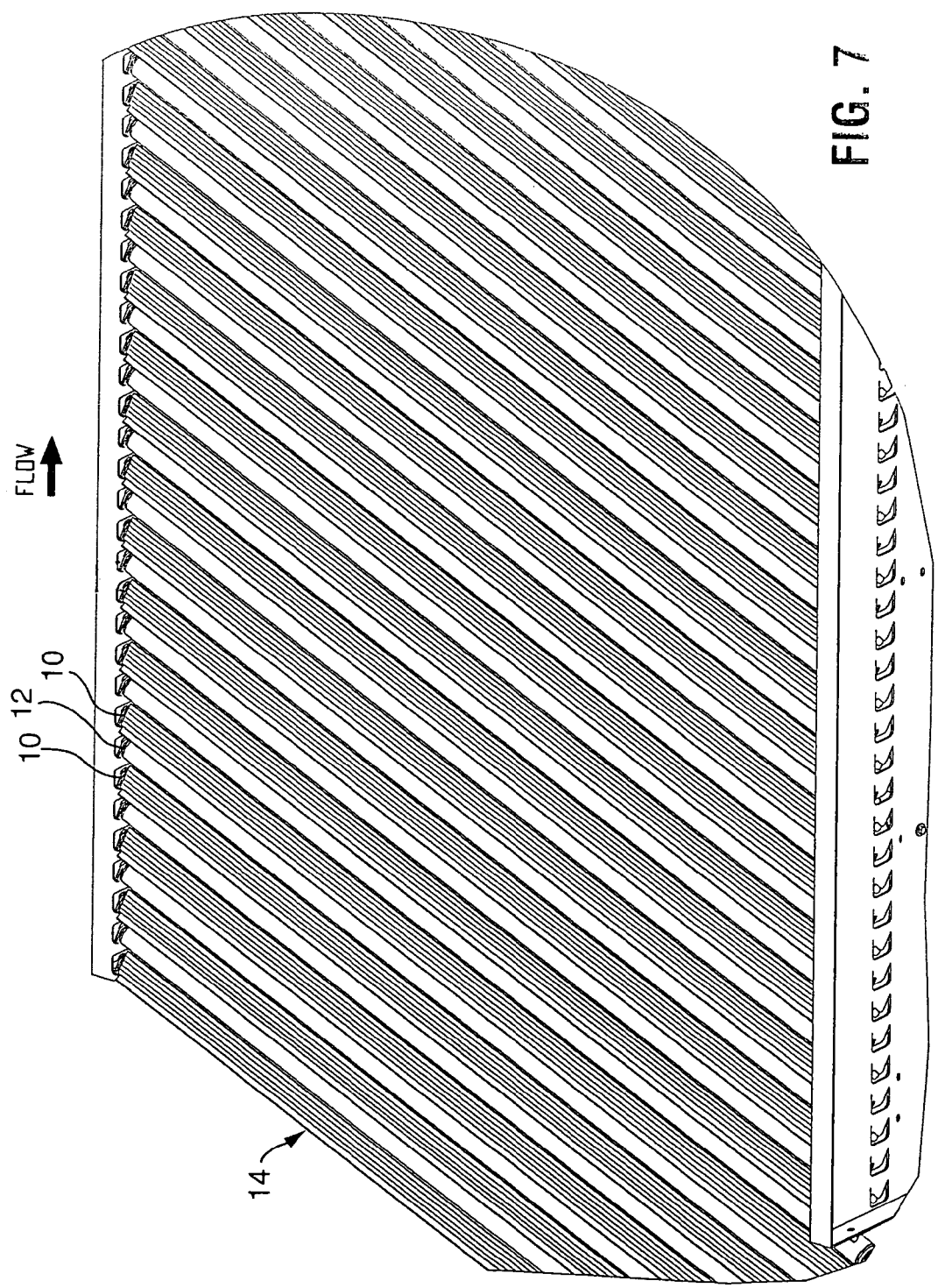
FIG. 7 is a perspective view of the conveyor shown in FIG. 6 using multiple glide assembly plate modules disposed between conveyor rollers providing a substantially solid surface.

As shown in FIGS. 6 and 7, a conveyor having conventional rollers can substitute the instant glide plate modules for the conventional conveyor rollers in an alternating manner to provide a substantially solid surface while reducing the number of rollers necessary for transport of the goods there over.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A glide plate assembly for insertion between at least two conveyor rollers of a conveyor having a pair of spaced apart opposing longitudinal members each one including at least one roller attachment bracket, said glide plate assembly, comprising:
    a longitudinal lateral cross member including side walls terminating in an inwardly curved lip;
    a support clip attaching to a distal end of said lateral cross member for cooperatively engaging said at least one roller attachment bracket;
    a glide plate comprising a main body including a pair of spaced apart opposing prongs projecting downward from said main body, each of said prongs including a shoulder for cooperatively engaging said curved lip, said guide plate including a front tab and a rear tab of a selected length; and
    said glide plate front tab includes a curved portion extending below an upper surface of said glide plate member main body with said front tab having a terminal front end extending upward to a selected position spaced apart from an outer surface of an adjacent conveyor roller providing a spring and flexing capability for the transfer of packages or parcels there over.

2. The glide plate assembly of claim 1, wherein said glide plate rear tab includes a straight proximate portion extending from said the main body and a rear distal portion angling downward extending below said main body and spaced apart from an outer edge of an adjacent conveyor roller.

3. The glide plate assembly of claim 1, wherein said glide plate is disposed at a selected level below a top surface of an adjacent roller.

4. The glide plate assembly of claim 1, wherein said front tab and said rear tab comprise a flexible material.

5. The glide plate assembly of claim 1, wherein said support clip is inserted within said longitudinal lateral cross member.

6. The glide plate assembly of claim 1, wherein said glide plate extends the entire length of said longitudinal lateral cross member.

7. The glide plate assembly of claim 1, wherein said glide plate includes an exterior surface including a friction altering material selected from the group consisting of a polyurethane coating, a paint coating, a metallic coating, a tape, a ceramic material, a silicone, a TEFLON, a solid tread, a tread including pores, a tread including cross-hatching, a tread including irregularities, a tread including a plurality of dimples, a tread including apertures there through, and combinations thereof.

8. A glide plate assembly for insertion between at least two conveyor rollers of a conveyor having a pair of spaced apart opposing longitudinal members each one including at least one roller attachment bracket, said glide plate assembly, comprising:
    a longitudinal lateral cross member including side walls terminating in an inwardly curved lip;
    a support clip attaching to a distal end of said lateral cross member for cooperatively engaging said at least one roller attachment bracket;
    a longitudinal glide plate comprising a main body including at least one pair of spaced apart opposing flanges projecting downward from said main body, each of said flanges including a shoulder for cooperatively engaging said curved lip, said guide plate including a front tab and a rear tab of a selected length; and
    said glide plate front tab includes a curved portion extending below an upper surface of said glide plate member main body with said front tab having a terminal front end extending upward to a selected position spaced apart from an outer surface of an adjacent conveyor roller providing a spring and flexing capability for the transfer of packages or parcels there over.

9. The glide plate assembly of claim 8, wherein said glide plate rear tab includes a straight proximate portion extending from said the main body and a rear distal portion angling downward extending below said main body and spaced apart from an outer edge of an adjacent conveyor roller.

10. The glide plate assembly of claim 8, wherein said glide plate is disposed at a selected level below a top surface of an adjacent roller.

11. The glide plate assembly of claim 8, wherein said front tab and said rear tab comprise a flexible material.

12. The glide plate assembly of claim 8, wherein said support clip is inserted within said longitudinal lateral cross member.

13. The glide plate assembly of claim 8, wherein said glide plate extends the entire length of said longitudinal lateral cross member.

14. The glide plate assembly of claim 8, wherein said glide plate includes an exterior surface including a friction altering material selected from the group consisting of a polyurethane coating, a paint coating, a metallic coating, a tape, a ceramic material, a silicone, a TEFLON, a solid tread, a tread including pores, a tread including cross-hatching, a tread including irregularities, a tread including a plurality of dimples, a tread including apertures there through, and combinations thereof.

15. A glide plate assembly for insertion between at least two conveyor rollers of a conveyor having a pair of spaced apart opposing longitudinal members each one including at least one roller attachment bracket, said glide plate assembly, comprising:
    a longitudinal lateral cross member including side walls having a retaining means;
    a support clip attaching to a distal end of said lateral cross member for cooperatively engaging said at least one roller attachment bracket;
    a longitudinal glide plate comprising a main body including means for attaching to said retaining means said guide plate including a front tab and a rear tab of a selected length; and said glide plate front tab includes a portion extending below an upper surface of said glide plate member main body with said front tab having a terminal front end extending upward to a selected position spaced apart from an outer surface of an adjacent conveyor roller providing a spring and flexing capability for the transfer of packages or parcels there over.

16. The glide plate assembly of claim 15, wherein said means for attaching comprises at least one pair of spaced apart opposing flanges projecting downward from said main body.

17. The glide plate assembly of claim 16, wherein each one of said flanges including a shoulder for cooperatively engaging said retaining means.

18. The glide plate assembly of claim 17, wherein said retaining means of said side walls of said longitudinal lateral cross member comprise a pair of inwardly curved lips.

19. The glide plate assembly of claim 15, wherein said portion of said glide plate front tab extending below an upper surface of said glide plate main body is curved upward terminating in an upwardly curved lip.

20. The glide plate assembly of claim 15, wherein said glide plate rear tab includes a straight proximate portion extending from said the main body and a rear distal portion angling downward extending below said main body and spaced apart from an outer edge of an adjacent conveyor roller.

21. The glide plate assembly of claim 15, wherein said glide plate is disposed at a selected level below a top surface of an adjacent roller.

22. The glide plate assembly of claim 15, wherein said front tab and said rear tab comprise a flexible material.

23. The glide plate assembly of claim 15, wherein said support clip is inserted within said longitudinal lateral cross member.

24. The glide plate assembly of claim 15, wherein said glide plate extends the entire length of said longitudinal lateral cross member.

25. The glide plate assembly of claim 15, wherein said glide plate includes an exterior surface including a friction altering material selected from the group consisting of a polyurethane coating, a paint coating, a metallic coating, a tape, a ceramic material, a silicone, a TEFLON, a solid tread, a tread including pores, a tread including cross-hatching, a tread including irregularities, a tread including a plurality of dimples, a tread including apertures there through, and combinations thereof.

26. The glide plate assembly of claim 15, wherein said terminal front end of said front tab extending upward to a selected position includes a straight portion angled upward to a selected position spaced apart from an outer surface of an adjacent conveyor roller providing a spring and flexing capability for the transfer of packages or parcels there over.

27. The glide plate assembly of claim 15, wherein said terminal front end of said front tab extending upward to a selected position includes an upwardly curved portion providing a spring and flexing capability for the transfer of packages or parcels there over.

* * * * *